United States Patent [19]
Sasaki et al.

[11] Patent Number: 5,225,477
[45] Date of Patent: Jul. 6, 1993

[54] INK COMPOSITIONS FOR WATERLESS PLATES

[75] Inventors: Makoto Sasaki, Kamakura; Yukio Kobayashi, Tokyo; Norimasa Ikeda; Mitsuru Suezawa, both of Otsu, all of Japan

[73] Assignees: Nippon Oil Co., Ltd.; Toray Industries Inc., both of Tokyo, Japan

[21] Appl. No.: 547,921

[22] Filed: Jul. 3, 1990

[30] Foreign Application Priority Data

Jul. 6, 1989 [JP] Japan .................................. 1-173047
Jul. 6, 1989 [JP] Japan .................................. 1-173048

[51] Int. Cl.$^5$ ................................................ C08L 73/00
[52] U.S. Cl. ..................................... 524/508; 525/68; 525/139; 526/272; 106/20 R; 106/22 R
[58] Field of Search ................. 106/20, 22; 524/508; 525/68, 139; 526/272

[56] References Cited

U.S. PATENT DOCUMENTS 4,126,739 11/1978 Hoene et al. .................. 526/272

FOREIGN PATENT DOCUMENTS 311402 4/1989 European Pat. Off. .

Primary Examiner—Joseph L. Schofer
Assistant Examiner—Peter D. Mulcahy
Attorney, Agent, or Firm—Bucknam and Archer

[57] ABSTRACT

The ink composition of waterless plates containing as the vehicle a resin III obtained by a process comprising copolymerizing (component A) a five-membered cyclic compound having a conjugated double bond, such as cyclopentadiene and/or a Diels-Alder adduct thereof, (component B) an α-olefin, and in addition to this, (component A') an unsaturated aromatic hydrocarbon monomer containing a carbon-carbon double bond and a benzene ring within the molecule to obtain a hydrocarbon resin I, reacting the thus obtained hydrocarbon resin I with (component C) an unsaturated carboxylic acid and/or the anhydride thereof to obtain an acid-modified resin II and then thermally reacting the thus obtained acid-modified resin II with (component D) a phenol resin, or containing a modified resin IV obtained by lengthening the molecular chain of the resin III with (component E) a molecular-chain elongating agent in a hydrocarbon solvent with a boiling point of 200° C. or more, a drying oil or a semi-drying oil or a mixture thereof.

12 Claims, No Drawings

INK COMPOSITIONS FOR WATERLESS PLATES

BACKGROUND OF THE INVENTION

1. Field of the Invention

This invention relates to an ink composition for waterless plates, which exhibits satisfactory resistance to scumming and excellent printability for use in waterless plate for lithography.

2. Prior Art

In lithography which is mainly used in the current printing field, printing is carried out by a process using a plate consisting of hydrophilic non-image area and oleophilic printing area and making use of the tendency that water and an oleophilic ink are repulsive to each other, wherein water is attached to the hydrophilic non-image area while an oleophilic ink is attached to the oleophilic printing area and then the oleophilic ink thus attached to the printing area is transferred to a to-be-printed substrate thereby obtaining a desired print.

In such conventional lithography, however, it is difficult to control the dampening solution which serves to prevent the ink from adhering to the non-image area. It is a serious technical obstacle to use such dampening solution, from the viewpoint of printability and printing effects. For that reason, there have been proposed many attempts to carry out a variety of waterless lithographic methods using waterless plates, which do not require such dampening solution. As the newest and practicable lithographic method using a waterless plate, there has been proposed a printing method using a plate in which the non-image area is covered with non-tacky thin films of silicone rubber or the like. It is reported that the printing method can perform printing with a common oleophilic ink without the supply of a dampening solution.

However, the reported method has now been found to be inappropriate, because it has a disadvantage such that scumming may occur when a conventional oleophilic ink is used for printing since the printability of the conventional ink is not suitable.

The phenomenon that scumming occurs in waterless lithography is due to the decreased cohesion potential of the ink of itself because the friction of the moving parts and rolls of the printing press used during printing raises the temperature of the plate, whereby the ink adheres to the non-image area which should originally be repulsive to ink.

Such phenomenon is a specific problem to occur only to waterless lithography. It is not at all required to take the phenomenon into consideration in case of the conventional lithography employing dampening solution. Since the conventional lithography employing dampening solution has a totally different repulsive mechanism of ink and furthermore the vaporization of dampening solution substantially suppresses the temperature rise of the print, it is not necessary to worry about such scumming phenomenon when using the conventional lithography. It is said that a lower cohesion of an ink may rather be preferable for the lithography.

To eliminate this drawback, there has been proposed a method comprising adding a silicone compound to an ink (Japanese Patent Gazette No. 50-11287, Japanese Patent Application Laid-open Gazette No. 55-31885), a method for modifying a resin with a silicone compound (Japanese patent Gazette Nos. 51-10124, 52-10041 and 52-10042), and the like. These methods, however, have not yet satisfactorily solved problems concerning scumming and have left other problems such as poor leveling of links, insufficient gloss, and the like.

There has also been proposed an improved method employing a varnish which is made into gell by incorporation with, for example, aluminum compound such as aluminum stearate, aluminum octoate, etc. When attempts are made to achieve high anti-scumming property by the above improved method, the ink used will greatly increase in viscosity, causing the problems such that the transferability of the ink, such as transfer of the ink on the printing press or to the plate or blanket, may be drastically depleted. That is, even the improved method is far from the stage satisfying the needs.

SUMMARY OF THE INVENTION

The object of this invention is to provide an ink composition for waterless plate, which may eliminate the above drawbacks of the conventional inks and which is excellent in scumming resistance, gloss and printability.

The present inventors made intensive studies in attempts to solve the above-mentioned problems. Consequently, they achieved the present invention.

The ink composition for waterless plates in accordance with the present invention employs as the vehicle a resin III obtained by a process comprising copolymerizing 100 parts by weight of (component A) a five-membered cyclic compound having a conjugated double bond represented by the following general formula;

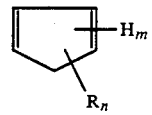

wherein H is hydrogen, R is an alkyl group having 1-3 carbon atoms, m and n are each zero or an integer of at least one, and $m+n=6$, and/or a Diels-Alder adduct thereof, 0-200 parts by weight of (component A') an unsaturated aromatic hydrocarbon monomer having a carbon-carbon double bond and a benzene ring in the molecule and 2-100 parts by weight of (component B) α-olefin to obtain a hydrocarbon resin I, reacting 100 parts by weight of the thus obtained hydrocarbon resin I with 0.5-30 parts by weight of (component C) an unsaturated carboxylic acid and/or the anhydride thereof to obtain an acid-modified resin II, and then thermally reacting 100 parts by weight of the thus obtained acid-modified resin II with 5-100 parts by weight of (component D) a phenol resin prepared by condensing a phenolic compound with formaldehyde, or contains a modified resin IV obtained by lengthening the molecular chain of the resin III with (component E) an elongating agent in a hydrocarbon solvent with a boiling point of 200° C. or more, a drying oil or a semi-drying oil or a mixture thereof.

The component A used in the present invention is either a five-membered cyclic compound having a conjugated double bond represented by the following general formula;

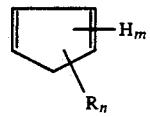

wherein H is hydrogen, R is an alkyl group having 1-3 carbon atoms, m and n are each zero or an integer of at least one, and m+n=6, including for example, cyclopentadiene, methylcyclopentadiene and the like; or a Diels-Alder adduct of the five-membered compound having the conjugated double bond, which is represented by the general formula, including for example dicyclopentadiene and cyclopentadiene-methylcyclopentadiene codimer, and tricyclopentadiene and the like. These and their mixtures may be preferably used industrially; more specifically, cyclopentadiene, dicyclopentadiene or a mixture of the two may be preferable.

Cyclopentadiene, dicyclopentadiene or an alkylsubstituted derivative thereof are not necessarily required to be highly pure. But it may be preferable that these may be present at least 80 wt % pure.

The component A used in this invention may also be a concentrated fraction obtained by thermally dimerizing cyclopentadiene and methylcyclopentadiene contained in a $C_5$ fraction as a by-product oil obtained by the high-temperature pyrolysis of naphtha and/or the like into mixtures of dicyclopentadiene and dimethylcyclopentadiene, cyclopentadiene-methylcyclopentadiene codimer, cyclopentadiene-isoprene codimer, cyclopentadiene-piperylene codimer and the like, and then evaporating and removing most of the $C_5$ ingredients such as $C_5$ olefins and $C_5$ paraffins from the codimer mixtures.

The $\alpha$-olefin of the component B used in this invention is a straight and/or branched $\alpha$-olefin having carbon atoms 4-40, more preferably 6-20, and having no alkyl group at $\beta$ position thereof.

For the $\alpha$-olefin of the component B used in this invention, a commercially available one may also be used, but industrially there may be used an $\alpha$-olefin obtained by a process of 1) oligomerization of ethylene, or 2) thermal decomposition of paraffin wax.

According to the process 1), an $\alpha$-olefin may be produced at a high purity, having an odd number of carbon atoms and being in straight chain without containing other isomers. According to the process 2), there may be produced an $\alpha$-olefin at a purity of about 90%, along with branched olefin, diolefin and naphthene as the remaining products, which may be also used.

If described specifically, there may be included 1-hexene, 4-methyl-1-pentene, 1-heptene, 1-octene, 1-nonene, 1-dodecene, 1-tetradecene, 1-hexadecene, 1-octadecene, 1-eicosene and the like. A mixed olefin obtained by the process 1) includes for example Dialene (product name; manufactured by Mitsubishi Kasei K.K.), while an olefin obtained by the process 2) includes for example Chevron $\alpha$-olefin (product name; manufactured by Chevron Co.). A mixture of two kinds or more of the above $\alpha$-olefins may be used as the component B.

For the unsaturated aromatic hydrocarbon monomer containing within the molecule of the monomer, a carbon-carbon double bond and a benzene ring (component A'), in accordance with the present invention, a compound having 8-20 carbon atoms such as styrene, $\alpha$-methylstyrene, vinyltoluene, indene, methylindene and the like, or a mixture thereof may be used. An aromatic fraction with a boiling point in a range or 140°-200° C., namely so-called $C_9$ fraction, may be preferable, industrially, which contains the above compounds produced as by-products at thermal decomposition of for example naphtha and the like. A fraction obtained by purifying the $C_9$ fraction which may contain 50% or more of the above compounds may be preferable. More preferably, a fraction which is obtained by further purification of the $C_9$ fraction and contains 70% or more of vinyltoluene may be used.

According to the present invention, 100 parts by weight of the above component A may be reacted with 0-200 parts, preferably 3-180 parts by weights of the component A', and 2-100 parts, preferably 4-80 parts by weight of the component B, in the absence or presence of catalyst to produce a hydrocarbon resin I. In case of the reaction in the absence of catalyst, a mixture of the components A and B, or a mixture of the components A, A' and B is heated at 200°-300° C. for 30 minutes to 20 hours, preferably 1-15 hours, to produce the hydrocarbon resin I. In case where the reaction is effected in the presence of a catalyst, there may be used, as the catalyst, a Friedel-Crafts' type catalyst such as boron trifluoride, a complex thereof with phenol, ether, acetic acid or the like, or aluminum chloride, to a final ratio of 0.1-10 wt %, preferably 0.3-2 wt % to the total content of monomers. In that case, the reaction temperature may be $-30°$ to 100° C., preferably 0° to 50° C., and the reaction time may be 10 minutes to 20 hours, preferably 1 to 15 hours.

In the production of the hydrocarbon resin I in accordance with the present invention, if the amount of the component B used is less than the range described above, there will be produced a resin III which cannot be sufficiently dissolved in a solvent with a high boiling point, whereby the resulting ink composition decreases in gloss. The molecular weight of the resin III does not get bigger, either, and therefore, the ink composition does not exhibit sufficient resistance to scumming. On the other hand, the use of the component B in amounts more than the range described above, will result in a lower yield of the resin, which may not be preferable economically.

In the production of the hydrocarbon resin I in accordance with the present invention, the use of the component A' may improve the dispersibility of a pigment for preparation of the ink composition, resulting in the increase in gloss of printed matters. Furthermore, the molecular weight of the resin III becomes greater and the resistance of the ink composition to scumming increases. But in case that the amount thereof exceeds the range described above, the solubility of the resin III in a solvent with a high boiling point becomes insufficient, leading to the decrease in gloss of the ink composition.

The hydrocarbon resin I thus obtained may be made to react with (component C) unsaturated carboxylic acid or the anhydride thereof. It is in general preferable to use as component C a mono- and poly-unsaturated carboxylic acid or the anhydride thereof, having 3-32 carbon atoms, more preferably 3-15 carbon atoms; the representative examples thereof may include acrylic acid, methacrylic acid, maleic acid, maleic anhydride, tetrahydrophthalic acid and the anhydride thereof, fumaric acid, citraconic acid, itaconic acid, and a mixture thereof or fatty acids of drying oil, for example, fatty acids from linseed oil. Among them, maleic acid and maleic anhydride may be preferable.

The amount of unsaturated carboxylic acid or the anhydride thereof to be used according to the present invention may be 0.5-30 parts, preferably 1-20 parts by weight per 100 parts by weight of the hydrocarbon resin I. If the amount of unsaturated carboxylic acid or the anhydride thereof may is less than the range described above, polar groups will be contained in a smaller amount in the resulting resin III, so that the resin has less characteristic as a resin having polar groups. For such reason, the resin III when employed as the vehicle for an ink composition is not satisfactory, in deteriorating the dispersibility of a pigment therein, fluidity of the ink composition and printing effects thereof.

Alternatively, the amount of unsaturated acid or the anhydride thereof more than the range described above may not be either preferable, in causing too much amount of polar groups, decreased solubility in solvents, and easy discoloration and gelation of the resin III. Furthermore, when the resin so produced is used in the preparation of an ink, it does not satisfactorily dissolve in a hydrocarbon solvent for making a varnish and the resulting ink will have poor fluidity and produce a print having poor gloss, undesirably. The acid modification reaction described above may be carried out in the absence of catalyst or in the presence of known radical initiators such as organic peroxide, at a temperature range of 100°-300° C., preferably 150°-250° C., for 30 minutes to 15 hours, preferably 1-8 hours; the reaction employing unsaturated polycarboxylic acid or the anhydride thereof may be preferably carried out in the absence of catalyst, while the reaction using unsaturated monocarboxylic acid or the anhydride thereof may be preferably effected in the presence of catalyst.

The acid modified resin II in accordance with the present invention, may be produced by the following one-step process.

That is, to the reaction system comprising a mixture of the components A and B, or a mixture of the components A, A' and B may be added unsaturated carboxylic acid or the anhydride thereof for thermal polymerization in the presence or absence of catalyst at a temperature of 200°-300° C., initially or during the intermediate stage of the reaction.

It is also possible to esterify the acid-modified resin II with alcohol in order to adjust the solubility and softening point thereof or adjust the molecular weight of the resin III. In this case, a monohydric or polyhydric alcohol may be used for the esterification. The use of a monohydric alcohol having at least 6, preferably 8-18 carbon atoms will result in producing a resin III having particularly good solubility. The amount of such alcohol is either 0-1.0 mol equivalent per mol equivalent of the carboxyl group in the acid-modified resin II or 0-2.0 mol equivalent per mol equivalent of the acid anhydride group in the acid-modified resin II. The esterifying reaction is carried out by thermally melting the acid-modified resin, or dissolving it in a hydrocarbon solvent such as benzene, toluene or xylene, to which is added an alcohol, and then reacting them together, for example, at 150°-250° C. for 30 minutes-10 hours, preferably 1-5 hours.

According to the present invention, the acid-modified resin II is further reacted with a phenol resin (component D) to obtain a resin, III. The phenol resin used in this invention may preferably be obtained by the condensation of phenol having an alkyl substituent of 4-9 carbon atoms with formaldehyde. Industrially, p-tert.-butylphenol, sec.-butylphenol, p-tert.-octylphenol or nonylphenol preferably used.

Instead of the reaction of the acid-modified resin II with a phenol resin, formaldehyde may be reacted with a phenolic compound in the presence of the acid-modified resin II, employing oxalic acid or maleic acid as the catalyst, or without using catalyst, to obtain a desired phenol resin-modified resin.

The amount of a phenol resin used for the modification may preferably be 2-100, more preferably 5-50 parts by weight per 100 parts by weight of the above acid-modified resin II. In case where the amount of the phenol resin is less than the range described above, the ink composition prepared by containing the resulting resin III as the vehicle will not produce satisfactory ink fluidity and glossy prints. On the other hand, the resin III prepared using the amount of a phenol resin more than the range described above is deteriorated in solubility in solvents for inks. It is not preferable, either, because of economical viewpoint for industrialization.

The reaction may be completed only by mixing and melting the acid-modified resin II with the phenol resin, and then heating the molten material at 150°-250° C. for 30 minutes-10 hours, preferably 1-5 hours. If needed, there may be used an acid catalyst, such as oxalic acid and toluenesulfonic acid, or a Friedel-Crafts' type catalyst, for the reaction.

It is preferable that the resin III have a softening point of 120° C. or more, specifically 140° C. or more. If a resin having a softening point lower than 120° C. is used in the preparation of a printing ink, the resulting printing ink will exhibit much misting, lowered drying speed and more importantly, deteriorated resistance to scumming.

The resin III thus obtained may preferably be contained in an ink in amounts by weight of 5-50%, more preferably 7-50%, still better 10-45% of the ink. In case where the resin III is used in amounts outside of the range described above in the preparation of an ink, the resulting ink will be likely to be unbalanced as such. For example, the use of the resin III in amounts by weight of less than 5 wt % will result in producing an ink which tends to cause scumming when used for printing because of its low cohesion. On the other hand, the use thereof in amounts by weight of more than 50 wt % will result in producing an ink which, when used, will possibly induce unsatisfactory transfer of the ink from roll to roll and unsatisfactory adhesion thereof to the blanket because of its too high cohesion. It will also potentially deteriorate its leveling on a to-be-printed substrate whereby the gloss is degraded.

The resin III may be further modified with a compound containing a silicone component, or the vehicle in a varnish may be wholly modified by adding a silicone ingredient-containing compound to the varnish when cooking the varnish. The silicone ingredient-containing compound used herein is usually represented by an organopolysiloxane which includes an organopolysiloxane having one or more hydroxyl groups or alkoxy groups in the molecule or having one or more Si—H bonds in the molecule. It is preferable that these compounds have molecular weight of 300-150,000.

According to the present invention, an ink composition may contain a modified resin IV which is obtained by elongating the molecular chain of the resin III with (component E) the molecular-chain elongating agent in a hydrocarbon solvent having a boiling point 200° C. or more, a drying oil or a semi-drying oil or a mixture thereof.

For the hydrocarbon solvent having a boiling point 200° C. or more, there may be used a wide variety of aliphatic-, alicyclic-, aromatic-hydrocarbons, having 12 or more carbon atoms. Preferably there may be used petroleum solvents having a boiling point 200°-350° C.

which routinely have been used as oily solvents for ink, including petroleum solvents having a high boiling point, such as paraffins, isoparaffins, α-olefins, naphthenes, paraffins containing aromatic groups.

For the drying oil, in accordance with the present invention, there may be used fat and oil from animals and plants having an iodine value 130 or more, including for example, linseed oil, oiticica oil, perilla oil, china wood oil, dehydrated castor oil, etc. and the polymers thereof. On the other hand, for the semi-drying oil, there may be used fat and oil from animals and plants having an iodine value 100-130, including for example, cotton seed oil, soybean oil, sesame seed oil, rape seed oil, etc. and the polymers thereof.

The molecular-chain elongating agent of the component E in accordance with the present invention is for elongating the molecular chain of the resin III under heating and stirring in a hydrocarbon solvent having a boiling point 200° C. or more, a drying oil or a semi-drying oil or in a mixture thereof. The molecular-chain elongating agent of the component E may include polycarboxylic acid and the derivative thereof, amine compound containing active hydrogen, resol-type phenol resin, polyhydric alcohol or mixtures thereof or the like.

The polycarboxylic acid and the derivative thereof used as the molecular-chain elongating agent of the component E may generally include polycarboxylic acid having 2-20 carbon atoms or the anhydride or monoester thereof. The polycarboxylic acid may preferably include carboxylic acid divalent or tetravalent, or the anhydride or monoester thereof. Specifically, they may be used adipic acid, succinic acid (succinic anhydride), hexahydrophthalic acid (hexahydrophthalic anhydride), phthalic acid (phthalic anhydride), dimeric acid, sebatic acid. There may be used, preferably, α,β-unsaturated dicarboxylic acid or the derivative thereof, such as maleic acid or (maleic anhydride), citraconic acid (or citraconic anhydride), fumaric acid, maleic acid monoalkylester and the like. The term (anhydride) means herein the acid itself or the acid anhydride.

The amine compound containing active hydrogen used as the molecular-chain elongating agent of the component E, in accordance with the present invention, including monoamine such as ethylamine, n-propylamine, n-butylamine, hexylamine, laurylamine, stearylamine, ethanolamine, allylamine; diamine such as ethylene diamine, trimethyldiamine, tetramethylene diamine, pentamethylenediamine, hexamethylenediamine; polyamine such as diethylenetriamine, triethylenetetramine, bis(hydroxydiethylene)triamine; and amine adducts, may be effectively used.

The amide compounds as amine derivatives may include mono-carboxylic acid such as formic acid, acetic acid, propionic acid, itaconic acid, caprylic acid, glycolic acid, acrylic acid, lauric acid, myristic acid, palmitic acid, stearic acid, oleic acid, linoleic acid, linolenic acid, etc.; organic dicarboxylic acid such as malonic acid, succinic acid, glutaric acid, adipic acid, pimelic acid, suberic acid, azelaic acid, sebacic acid, maleic acid, fumaric acid, dimeric acid, etc.; organic tricarboxylic acid such as trimellitic acid, etc.; condensation products of organocarboxylic acid with said amine, diamine and polyamine and the like such as 3.9-bis(2-carboxylalkyl)2,4,8,10-tetraoxaspiroundecane, etc.

The amine compound containing active hydrogen to be used in the present invention, is has the structure and composition described above. In view of handling and safety, however, polyamide resins are preferable; in view of compatibility with resin and solvent, a polyamide resin consisting of an acid having 6-60 carbon atoms and polyamine, is particularly preferable.

The molecular weight of the polyamide resin described above is in the range of 500-20,000; more preferably, it is in the range of 500-10,000.

The resol-type phenol resin used as the molecular-chain elongating agent (component E) may include what is obtained by reacting formaldehyde, in the presence of alkaline catalyst, with phenols such as phenol, cresol, p-tert.-butylphenol, p-octylphenol, p-nonylphenol, p-phenylphenol, bis(phenol) A, p-aminophenol, following known methods.

The polyhydric alcohol used as the molecular-chain elongating agent of the component E may not be specifically limited, but generally divalent or tetravalent polyhydric alcohol is preferable. Specifically, those having 2-15 carbon atoms such as ethyleneglycol, propyleneglycol, butyleneglycol, diethyleneglycol, dipropyleneglycol, hexanediol, hexanetriol, trimethylolpropane, glycerine, pentaerythritol, dipentaerythritol and the like may be preferably used.

The modified resin IV may be obtained by reacting the resin III with polycarboxylic acid and the derivative thereof, or amine compounds containing active hydrogen, resol-type phenol resin, polyhydric alcohol or a mixture thereof, in the presence of a hydrocarbon solvent having a boiling point 200° C. or more, or a drying oil or a semi-drying oil, or a mixture thereof. The reaction condition therefor is generally in the temperature range of 70°-250° C., more preferably in the range of 100°-230° C.; the concentration of a reacting substance may generally be 5-80 wt %, more preferably 20-70 wt %. The reaction may be carried out following the process for producing a varnish composition for a printing ink composition, comprising initial heating and dissolving a resin component in a solvent component, and subsequently adding a molecular-chain elongating agent at a given temperature; or comprising mixing a resin component, a drying oil, and a solvent, followed by heating and dissolution, and subsequently adding a molecular-chain elongating agent at a given temperature for reaction. The adding sequence may be changed in such manner. A component such as polar solvent or hydrocarbon solvent or the like as the varnish composition for ink may be also contained in such reaction system and other components may be contained, on a needed basis, as well.

The reaction time may be appropriately selected, depending on a property required for a varnish composition for the intended ink composition, and generally may be 0.1-10 hours, preferably 0.5-6 hours.

The composition containing the resin III and the modified resin IV in accordance with the present invention may be made into ink, by adding the other known ink components which have been used in the routine lithography.

They include drying and semi-drying oils such as linseed oil, tung oil, soybean oil, safflower oil, castor oil, etc.; solvents such as petroleum-derived solvents having a boiling point 200°-350° C.; gelling agents such as organoaluminum compounds, organotitanate compound, organozinc compound and organocalcium compound.

Coloring agents which may be used in the preparation of ink compositions of this invention are such inorganic and organic ones that have heretofore been used in the conventional ink compositions.

Known ingredients such as waxes, greases, desiccants, dispersants and fillers may be used in this invention if necessary.

In addition to these, other resins such as phenol resins, rosin ester, rosin-modified phenol resin, alkyd resins and petroleum resins, maleic acid resin, and the like may also be combined and used with the substances described above, as long as the resins may not deteriorate the properties of the ink composition.

They may be simply added, or they may be used after cooking with the resin composition obtained by the present invention. Known gelling agents such as organoaluminum compounds may be also used.

The ink prepared by kneading such ingredients with a three-roll unit as mentioned above does not cause scumming except at high temperatures, but shows excellent printability. Further, printed matters using the above ink have satisfactory gloss without causing piling.

DESCRIPTION OF THE PREFERRED EMBODIMENTS

This invention will be better understood by the following examples, but the invention is not limited to them.

SYNTHESIS 1

Seven hundred and sixty (760) grams of 97% pure dicyclopentadiene and 240 g of 1-decene were charged in a 2-liter autoclave and heated to 280° C. under agitation for 5 hours in nitrogen atmosphere. After completion of heating, the autoclave was cooled and the contents therein were distilled to remove the unreactive monomers and low polymers therefrom to obtain 930 g of a hydrocarbon resin (I-1) as the residue in the autoclave. The hydrocarbon resin (I-1) had a softening point of 137.0° C.

Three hundred grams of the resin (I-1) was heated and dissolved at 200° C., followed by addition of 15.0 g of maleic anhydride, and reacted for 4 hours to obtain an acid-modified resin (II-1). The softening point of the resin (II-1) was 152.0° C. and the acid value thereof was 24.3. Subsequently, to 255 g of the acid-modified resin (II-1) was added 45 g of the resol-type phenol resin obtained by the condensation reaction between p-tert.-octylphenol and formaldehyde, reacted at 220° C. for 2 hours, to obtain a modified resin (III-1) having a softening point of 178.3° C. and an acid value of 20.8.

SYNTHESIS 2

Seven hundred and ninety (790) grams of 97% pure dicyclopentadiene and 210 g of a mixture of α-olefins having 6–10 carbon atoms (Dialene 610; manufactured by Mitsubishi Kasei K.K.) were charged in a 2-liter autoclave and heated to 280° C. for 2.5 hours, followed by the same treatment as in Synthesis 1, to obtain 920 g of a hydrocarbon resin (I-2). The resin (I-2) had a softening point of 143.0° C.

Three hundred grams of the resin (I-2) was heated and dissolved at 200° C., followed by addition of 9.0 g of maleic anhydride, and reacted for 4 hours to obtain an acid-modified resin (II-2). The softening point of the resin (II-2) was 155.0° C., and the acid value thereof was 13.9. Subsequently, to the acid-modified resin (II-2) was added 45 g of the resol-type phenol resin obtained by the condensation reaction between p-tert.-octylphenol and formaldehyde, reacted at 220° C. for 2 hours, to obtain a modified resin (III-2) having a softening point of 183.5° C. and an acid value of 13.1.

SYNTHESIS 3

Five hundred (500) grams of 97% pure dicyclopentadiene, 300 g of an aromatic fraction (comprising 50 wt % of the unsaturated aromatic component and 50 wt % of the saturated aromatic component, 70 wt % of the unsaturated aromatic component being vinyltoluene), which was produced from the thermal decomposition of naphtha and had a boiling point in the range of 140°–200° C. and, were charged in a 2-liter autoclave and heated to 280° C. for 6 hours, followed by the same treatment as in Synthesis 1, to obtain 841 g of a hydrocarbon resin (I-3). The resin (I-3) had a softening point of 139.5° C.

Three hundred grams of the hydrocarbon resin (I-3) was heated and dissolved at 200° C., followed by addition of 9.0 g of maleic anhydride, and reacted for 4 hours to obtain an acid-modified resin (II-3). The softening point of the resin (II-3) was 154.5° C. and the acid value thereof was 12.8. Subsequently, to 255 g of the acid-modified resin (II-3) was added 63 g of the resol-type phenol resin obtained by the condensation reaction between p-tert.-nonylphenol and formaldehyde, and reacted at 220° C. for 2 hours, to obtain a modified resin (III-3) having a softening point of 175.0° C. and an acid value of 13.4.

COMPARATIVE SYNTHESIS

Seven hundred (700) grams of 97% pure dicyclopentadiene and 300 g of a mixed xylene were stirred at 260° C. for 2.5 hours in a 2-liter autoclave, followed by the same treatment as in Synthesis 1, to obtain 571 g of a resin (I-4). The resin (I-4) had a softening point of 140.5° C.

Two hundred and forty grams of the resin (I-4) was heated and dissolved at 220° C., followed by addition of 7.2 g of maleic anhydride, and reacted for 4 hours under agitation to obtain an acid-modified resin (II-4). The softening point of the resin (II-4) was 151.5° C. and the acid value thereof was 11.4. Subsequently, to 180 g of the acid-modified resin (II-4) was added 20 g of the resol-type phenol resin obtained by the condensation reaction between p-tert.-octylphenol and formaldehyde, reacted at 220° C. for 3 hours, to obtain a modified resin (III-4) having a softening point of 170.5° C. and an acid value of 11.2.

EXAMPLES 1–3 AND COMPARATIVE EXAMPLES 1–3

The resins obtained in Syntheses 1–3 and Comparative Synthesis, aforementioned, and control resins, were used for preparing a varnish and gel varnish. An ink composition was prepared using each of the varnishes and gel varnishes, and evaluated for ink characteristics or performances with the results being shown in Table 1.

The control resin used in Comparative Examples 2–3 was a resin produced under the trademark "Tamanol 354" by Arakawa Chemical Co., Ltd., Japan, and the ink used in Comparative Example 3 was the one which had been adjusted to cause scumming at 30° C. by adding a solvent "Solvent No. 5" (an organic solvent for inks, produced by Nippon Oil Co., Ltd.) to the ink of Comparative Example 2.

Further, varnishes, gel varnishes and ink compositions were respectively prepared as indicated hereunder, and the evaluations for ink characteristics as well as the results of printing were as shown below.

Preparation of Varnish

Forty (40) parts by weight of each of the resins [III] and 20 parts by weight of linseed oil No. 4 (a drying oil for inks, produced by Toshin Oil and Fat Co., Ltd.) were cooked at 200°–210° C. for 30 minutes, followed by addition 40 parts by weight of Solvent No. 5 (an organic solvent for ink, manufactured by Nippon Oil Co., Ltd.) and then heated to 140°–150° C. for 20 minutes thereby to obtain a varnish.

Preparation of Gel Varnishes

Forty (40) parts by weight of each of the resins [III] and 20 parts by weight of linseed oil No. 4 were cooked at 200°–210° C., followed by addition of 2.0 parts by weight of Optope Al (a gelling agent for varnishes, produced by Hope Pharmaceutical Co., Ltd.) and 38 parts by Solvent No. 5, and then heated to 140°–150° C. for 20 minutes thereby to obtain a gel varnish.

Preparation of Ink Compositions

Ink composition was kneaded using a three-roll unit at the following compounding ratio.

Seika First Yellow 2340 15.0 parts by weight (a pigment for inks, prepared by Dainichi Seika Co., Ltd., Japan)

| | |
|---|---|
| Varnish | 64.7 parts by weight |
| Gel varnish | 20.0 parts by weight |
| Cobalt naphthenate | 0.3 parts by weight |

(a dryer for inks, produced by Nakarai Chemicals Ind. Co., Ltd., Japan)

Characteristics of Ink Compositions and Methods for Evaluation

The printing machine used was an improved one in which the drum surface might be elevated in temperature by passing warmed water through the inside of the drum and to which a Toray-type waterless plate (positive type) was fixed. Printing was effected while elevating the temperature of the surface of the plate without supplying a dampening solution, and the temperature of the plate surface at which the prints obtained with the test ink composition exhibited scumming at a certain fixed color density on solid was considered as a scumming-occurring temperature. In practical printing, the higher scumming-temperature an ink composition has, the more difficult is it for the ink to cause scumming.

Then at 30° C., the ink compositions so prepared were measured for their fluidity (flow values) with a spread meter and for their tack value with an ink-meter.

These ink compositions were respectively printed on a to-be-printed substrate using a waterless plate having non-image area made of silicone rubber on a Komori splint lithographic printing press, without supplying dampening solution to the plate to obtain prints. Then the solid of the print at which the color density was 0.95 as determined by a Macbeth densitometer, were measured for their gloss value with a 60-degree specular reflection glossmeter. The results are as shown in Table 1.

TABLE 1

| Examples Compara. Examples | Resin type | Scumming-occurring temperature (°C.) | Tack value | Flow value | Gloss | Piling |
|---|---|---|---|---|---|---|
| Example 1 | III-1 (Synthesis 1) | 31 | 12.0 | 35.0 | 60 | none |
| Example 2 | III-2 (Synthesis 2) | 32 | 12.0 | 36.0 | 62 | none |
| Example 3 | III-3 (Synthesis 3) | 31 | 13.0 | 36.0 | 64 | none |
| Compara. Example 1 | III-4 (Comparative Synthesis 1) | 24 | 13.0 | 36.0 | 59 | none |
| Compara. Example 2 | Control | 34 | 20.0 | 35.0 | 45 | severe |
| Compara. Example 3 | Control | 30 | 17.0 | 36.0 | 50 | mild |

The results of Table 1 show that the ink compositions of this invention obtained in Examples 1–3 have satisfactory resistance to scumming and excellent printability, as compared with that obtained in Comparative Example 1, and that the prints obtained with the former ink compositions have satisfactory gloss as compared with that obtained with the latter. In addition, the ink compositions using the control resins, obtained in Comparative Examples 2–3, exhibit satisfactory resistance to scumming. But they exhibit high tack values thereby to cause piling during printing, and the prints obtained therewith do not have satisfactory gloss.

EXAMPLE 4

Thirty-three parts by weight of the resin (III-3) obtained in Synthesis 3, 13 parts by weight of linseed oil No.7 (a drying oil for inks, produced by Toshin oil and Fat Co., Ltd.), 7 parts by weight of Solvent No.3 (a hydrocarbon solvent for inks, produced by Nippon Oil Co., Ltd.), and 3 parts by weight of Dialene 168 (a hydrocarbon solvent for inks, produced by Mitsubishi Kasei, Co., Ltd.) were mixed in nitrogen stream, and heated to elevate temperature thereof. While heating and stirring at 200° C., 2 parts by weight of maleic anhydride was added. After further heating under stirring at 200° C. for 2 hours, 29 parts by weight of Solvent No. 3 and 13 parts by weight of Dialene 168 were added, followed by heating and agitation at 150° C. for 30 minutes, to obtain the varnish (1).

To 83 parts of the varnish (1) thus obtained was added 17 parts by weight of Shimura Brilliant Carmine 6B 233 (a red pigment for inks, produced by Dai-Nippon Ink Kagaku Kogyo, K.K.) and kneaded with a three-roll unit following the routine method to obtain the ink A.

EXAMPLE 5

Forty parts by weight of the resin (III-3) obtained in Synthesis 3 and 15 parts by weight of linseed oil No.4 were mixed in nitrogen stream, and heated to elevate temperature thereof. While heating and stirring at 200° C., 3 parts by weight of organopolysiloxane containing Si-H group (manufactured by Toray-Silicone Co., Ltd., BY 10-912) and 0.05 parts by weight of dibutyltin diacetate were added. After further heating under stirring at 200° C. for 1 hour, 30 parts by weight of Solvent No.3 and 12 parts by weight of Dialene 168 were added, followed by heating and agitation at 150° C. for 30 minutes, to obtain the silicone-modified varnish (2).

To 20 parts of the silicone-modified varnish (2) thus obtained and 63 parts by weight of the varnish (1) obtained in Example 1 was added 17 parts by weight of Shimura Brilliant Carmine 6B 233 and kneaded using a three-roll unit following the routine method to obtain the ink B.

EXAMPLE 6

Thirty-three parts by weight of the resin (III-3) obtained in Synthesis 3, 13 parts by weight of linseed oil No.7, 36 parts by weight of Solvent No.3 and 16 parts by weight of Dialene 168 were mixed in nitrogen stream, and heated to elevate temperature thereof. While heating and stirring at 180° C. for 1 hour, 2 parts by weight of a polyamide compound (molecular weight 5,000) as a condensation product between dimeric acid and diethylenetriamine (molar ratio of 1:1) were added and heated under stirring at 120° C. for 30 minutes, to obtain the varnish (3).

To 83 parts by weight of the varnish (3) thus obtained was added 17 parts by weight of Shimura Brilliant Carmine 6B 233 and kneaded using a three-roll unit following the routine method to obtain the ink C.

EXAMPLE 7

Thirty-three parts by weight of the resin (III-3) obtained in Synthesis 3, 13 parts by weight of linseed oil No.7, 7 parts by weight of Solvent No.3 and 3 parts by weight of Dialene 168 were mixed in nitrogen stream, and heated to elevate temperature thereof. While heating and stirring at 200° C., 2 parts by weight of the resol-type phenol resin obtained by initial condensation reaction between p-amylphenol and formaldehyde by the known method using an alkali catalyst was added, and heated under stirring at 200° C. for 3 hours. Subsequently, 29 parts by weight of Solvent No.3 and 13 parts by weight of Dialene 168 were added and heated under agitation at 150° C. for 30 minutes to obtain the varnish (4).

To 83 parts of the varnish (4) thus obtained was added 17 parts by weight of Shimura Brilliant Carmine 6B 233 and kneaded using a three-roll unit following the routine method to obtain the ink D.

EXAMPLE 8

Thirty-three parts by weight of the resin (III-3) obtained in Synthesis 3, 13 parts by weight of linseed oil No.7, 7 parts by weight of Solvent No.3 and 3 parts by weight of Dialene 168 were mixed in nitrogen stream, and heated to elevate temperature thereof. While heating and stirring at 200° C. for 5 hours, 2 parts by weight of trimethylolpropane was added, and heated under stirring at 200° C. for 5 hours. Subsequently, 29 parts by weight of Solvent No.3 and 13 parts by weight of Dialene 168 were added and heated under agitation at 150° C. for 30 minutes to obtain the varnish (5).

To 83 parts of the varnish (5) thus obtained was added 17 parts by weight of Shimura Brilliant Carmine 6B 233 and kneaded using a three-roll unit following the routine method to obtain the ink E.

COMPARATIVE EXAMPLE 4

Thirty-five parts by weight of the resin (III-3) obtained in Synthesis 3, 13 parts by weight of linseed oil No.7, 7 parts by weight of Solvent No.3 and 13 parts by weight of Dialene 168 were mixed in nitrogen stream, and heated to elevate temperature thereof. While heating and stirring at 200° C. for 2 hours, 29 parts by weight of Solvent No.3 and 13 parts by weight of Dialene 168 were added and heated under agitation at 150° C. for 30 minutes to obtain the varnish (6).

To 83 parts of the varnish (6) thus obtained was added 17 parts by weight of Shimura Brilliant Carmine 6B 233 and kneaded using a three-roll unit following the routine method to obtain the ink F.

COMPARATIVE EXAMPLE 5

Thirty-five parts by weight of the resin (III-4) obtained in Comparative Synthesis, 13 parts by weight of linseed oil No.7, 7 parts by weight of Solvent No.3 and 3 parts by weight of Dialene 168 were mixed in nitrogen stream, and heated to elevate temperature thereof. While heating and stirring at 200° C. for 2 hours, 29 parts by weight of Solvent No.3 and 13 parts by weight of Dialene 168 were added and heated under agitation at 150° C. for 30 minutes to obtain the varnish (7).

To 83 parts of the varnish (7) thus obtained was added 17 parts by weight of Shimura Brilliant Carmine 6B 233 and kneaded using a three-roll unit following the routine method to obtain the ink G.

COMPARATIVE EXAMPLE 6

Thirty-three parts by weight of the resin (III-4) obtained in Comparative Synthesis, 13 parts by weight of linseed oil No.7, 7 parts by weight of Solvent No.3 and 3 parts by weight of Dialene 168 were mixed in nitrogen stream, and heated to elevate temperature thereof. While heating and stirring at 200° C., 2 parts by weight of maleic anhydride was added, and heated under stirring at 200° C. for 2 hours. Subsequently, 29 parts by weight of Solvent No.3 and 13 parts by weight of Dialene 168 were added and heated under agitation at 150° C. for 30 minutes to obtain the varnish (8).

To 83 parts of the varnish (4) thus obtained was added 17 parts by weight of Shimura Brilliant Carmine 6B 233 and kneaded using a three-roll unit following the routine method to obtain the ink H.

The inks A-H thus obtained in Examples and Comparative Examples were examined of their properties as ink and printing features, by individual methods. The results are shown in Table 2. The methods for examining the properties as ink and the printing features were the same as employed in Example 1.

TABLE 2

| Ink type | Scumming-occurring temperature (°C.) | Tack value | Flow value (mm) | Gloss |
| --- | --- | --- | --- | --- |
| Ink A | 35 | 6.6 | 37.8 | 51 |
| Ink B | 35 | 6.0 | 37.2 | 51 |
| Ink C | 36 | 6.4 | 35.4 | 50 |
| Ink D | 36 | 7.0 | 35.6 | 52 |
| Ink E | 35 | 6.8 | 36.0 | 51 |

TABLE 2-continued

| Ink type | Scumming-occurring temperature (°C.) | Tack value | Flow value (mm) | Gloss |
|---|---|---|---|---|
| Ink F | 27 | 8.6 | 39.4 | 53 |
| Ink G | 24 | 9.2 | 42.1 | 53 |
| Ink H | 29 | 8.2 | 39.2 | 52 |

The results of Table 2 show that the inks A–E of the present invention obtained in Examples 4–8 are satisfactory in that they have higher scumming-occurring temperature and lower tack values than that of the inks F–H of Comparative Examples 4–6.

In practical printing tests for comparing the inks A–E of Examples 4–8 with the inks F–H of Comparative Examples 4–6, no scumming was caused in the inks A–E, which suppressed printing troubles such as piling, peeling, etc. The gloss of printed matters was measured. Consequently the inks A–E showed the same degree of gloss as that of the inks F–H, although the inks A–E had higher resistance to scumming.

What is claimed is:

1. An ink composition for waterless plates containing as the vehicle a resin III, the resin being obtained by a process comprising copolymerizing 100 parts by weight of at least one compound A which is a member selected from the group consisting of a five-membered cyclic compound having a conjugated double bond of formula:

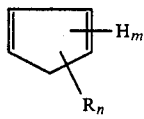

wherein H is hydrogen, R is an alkyl group having 1–3 carbon atoms, m and n are each zero or an integer of at least one, and $m+n=6$, and Diels-Alder adducts thereof, with 0–200 parts by weight of an unsaturated aromatic hydrocarbon monomer A' having a carbon-carbon double bond and a benzene ring within the molecule and 2–100 parts by weight of an α-olefin B to obtain a hydrocarbon resin I, reacting 100 parts by weight of said hydrocarbon resin I with 0.5–30 parts by weight of at least one compound C which is a member selected from the group consisting of an unsaturated carboxylic acid and anhydride thereof to obtain an acid-modified resin II, and thermally reacting 100 parts by weight of said acid-modified resin II with 2–100 parts by weight of a phenol resin D prepared by condensing a phenol compound with formaldehyde to obtain a reaction mixture and recovering said resin III from the reaction mixture.

2. An ink composition for waterless plates containing a modified resin IV obtained by lengthening the molecular chain of said resin III from claim 1 with a molecular-chain elongating agent E in a hydrocarbon solvent with a boiling point of 200° C. or higher, a drying oil or semi-drying oil or a mixture thereof.

3. The ink composition for waterless plates according to claim 1, wherein said compound A is at least one member selected from the group consisting of cyclopentadiene, methylcyclopentadiene, dicyclopentadiene, cyclopentadiene-methylcyclopentadiene copolymer and tricyclopentadiene.

4. The ink composition for waterless plates according to claim 2, wherein said compound A is at least one member selected from the group consisting of cyclopentadiene, methylcyclopentadiene, dicyclopentadiene, cyclopentadiene-methylcyclopentadiene copolymer and tricyclopentadiene.

5. The ink composition for waterless plates according to claim 1, wherein said α-olefin B has 4–40 carbon atoms.

6. The ink composition for waterless plates according to claim 2, wherein said α-olefin B has 4–40 carbon atoms.

7. The ink composition for waterless plates according to claim 1, wherein said compound A' is at least one member selected from the group consisting of styrene, vinyltoluene, -methylstyrene, indene and methylindene.

8. The ink composition for waterless plates according to claim 7, wherein said compound A' is at least one member selected from the group consisting of styrene, vinyltoluene, α-methylstyrene, indene and methylindene.

9. The ink composition for waterless plates according to claim 2, wherein said molecular-chain elongating agent E is at least one member selected from the group consisting of a polycarboxylic acid, a derivative thereof, and a mixture thereof.

10. The ink composition for waterless plates according to claim 2, wherein said molecular-chain elongating agent E is an amine compound containing active hydrogen.

11. The ink composition for waterless plates according to claim 2, wherein said molecular-chain elongating agent E is a resol type phenol resin.

12. The ink composition for waterless plates according to claim 2, wherein said molecular-chain elongating agent E is a polyhydric alcohol.

* * * * *